United States Patent Office 3,329,692
Patented July 4, 1967

3,329,692
1-AMINO-4-HYDROXY-2-(CYANO- AND CYANO-
ALKYL-PHENOXY)-ANTHRAQUINONES
Visvanathan Ramanathan, Basel, Switzerland, assignor to
Ciba Limited, Basel, Switzerland, a Swiss company
No Drawing. Filed July 8, 1963, Ser. No. 293,285
Claims priority, application Switzerland, July 9, 1962,
8,210/62
3 Claims. (Cl. 260—380)

The present invention provides 1-amino-2-aryloxy-4-hydroxy-anthraquinones that are free from acidic groups imparting solubility in water, especially sulfonic acid groups, and whose aryl radical contains at least one group of the formula (1) 

in which $n$ represents an integer of 1 to 10.

The dyestuffs advantageously correspond to the formula (2) 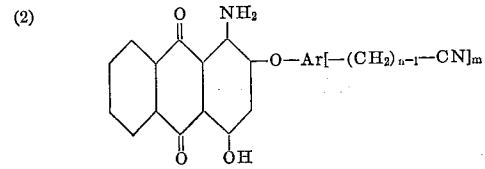

in which Ar represents an arylene radical, $m$ represents an integer of 1 to 2 and $n$ represents an integer of 1 to 5.

Of special importance, however, are the dyestuffs of the formula (3) 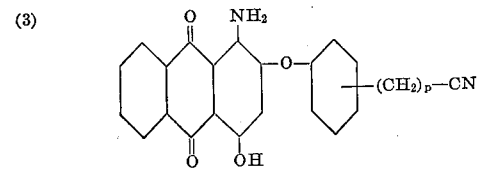

in which $p$ represents an integer of 1 to 3.

The new dyestuffs are obtained when a 1-amino-2-halogen-4-hydroxy-anthraquinone, especially 1-amino-2-bromo-4-hydroxy-anthraquinone, is reacted with a hydroxylaryl compound that contains at least one group of the formula

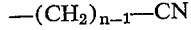

in which $n$ has the meaning given above. The starting materials advantageously used are hydrobenzenes, especially those of the formula

in which $m$, $n$ and Ar have the meanings given above and in which the arylene radicals may contain further substituents that do not impart solubility in water, for example, halogen atoms, alkyl alkoxy, alkoxy-carboxy, aliphatic acyl or nitro groups.

Hydrobenzenes that are specially suitable for the manufacture of the new dyestuffs according to the process of the invention are those of the formula

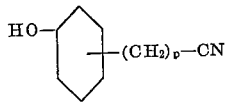

in which $p$ represents an integer of 1 to 3.

As examples there may be mentioned:
hydroxy-cyano-aryl compounds, for example,
1-hydroxy-4-cyanobenzene,
1-hydroxy-3-cyanobenzene,
1-hydroxy-2-cyanobenzene, and
1-hydroxy-2-chloro-4-cyanobenzene,
hydroxy-cyano-alkyl-aryl compounds, for example,
1-hydroxy-4-β-cyano-ethylbenzene,
1-hydroxy-3-cyanomethylbenzene,
1-hydroxy-4-cyanomethylbenzene and
1-hydroxy-2-bromo-β-4-cyano-ethylbenzene.

The reaction is advantageously carried out in the presence of an agent capable of binding acid, for example, an alkali hydroxide such as sodium or potassium hydroxide or an alkali carbonate.

The reaction in accordance with the process of the invention can be carried out in an inert solvent, for example, in nitrobenzene, or in an excess of the phenolic reaction component. It is advantageously performed at an elevated temperature.

The new dyestuffs so obtained are eminently suitable, especially after conversion into a finely dispersed form, for dyeing and printing synthetic fibrous material, especially fibrous material made of aromatic polyesters, and they are also suitable for dyeing and printing cellulose ester fibres and polyamide fibres. Red dyeings that are distinguished by a specially good fastness to light and to sublimation are obtained on such fibres by the conventional dyeing methods, for example, from a dye liquor, which contains a dispersion of the dyestuff and advantageously a dispersing agent, at a temperature close to 100° C., if necessary, in the presence of a swelling agent, or at a temperature above 100° C. under super-atmospheric pressure.

The new dyestuffs possess good building-up properties.

A further attribute of the dyestuffs of the invention is that they reserve wool well, which makes them specially suitable for the dyeing of union fabrics made of polyester fibres and wool.

The dyestuffs of the invention are also suitable for application by the so-called "Thermosol" process, in which process the fabric to be dyed is impregnated at a temperature not exceeding 60° C. with an aqueous dispersion of the dyestuff that advantageously contains 1 to 50% of urea and a thickening agent, especially sodium alginate, and then squeezed in the usual manner. Advantageously, squeezing is carried out in such a manner that the impregnated fabric retains 50 to 100% by weight of dye liquor, calculated on its dry weight. In order to bring about fixation of the dyestuff, the fabric thus impregnated is heated to a temperature above 100° C., for example, to a temperature between 180 and 210° C., advantageously after an intermediate drying operation, for example, in a current of hot air.

The Thermosol process just mentioned is of special interest for the dyeing of union fabrics made of polyester fibres and cellulosic fibres, especially cotton. In this case, the padding liquor contains, in addition to the dyestuff of the invention, dyestuffs suitable for dyeing cotton, for example, vat dyestuffs. When the latter are used, the padded fabric has to be treated with an aqueous alkaline solution of one of the reducing agents normally used in vat dyeing after it has been subjected to the heat treatment.

The following examples illustrate the invention. The parts and percentages are by weight:

Example 1

A mixture comprising 25 parts of 1-amino-2-bromo-4-hydroxy-anthraquinone, 100 parts of 1-hydroxy-4-β-cyano-ethylbenzene and 6.5 parts of potassium carbonate is heated for about 22 hours at 155° C., while stirring. After cooling the reaction mixture, 100 parts of alcohol are added, while stirring, the dyestuff which precipitates thereby is filtered off and then washed with hot water. The dyestuff so obtained dyes polyester fibres red tints possessing a good fastness to light and to sublimation, and reserves to a large extent wool treated in the same dyebath.

By using the same amount of 1-hydroxy-4-cyanomethylbenzene or 1-hydroxy-4-cyanobenzene (para-hydroxybenzonitrile) instead of 1-hydroxy-4-β-cyano-ethylbenzene, dyestuffs possessing similar properties are obtained.

Example 2

1 part of an aqueous paste of the dyestuff obtained in the manner described in the first paragraph of Example 1 and approximately 1 part of dried sulfite cellulose waste liquor are ground to a fine paste in a roller mill, the paste so obtained having a dyestuff content of about 10%.

100 parts of fibrous material made of polyethylene terephthalate are washed for ½ hour in a bath containing 1 to 2 parts of the sodium salt of N-benzyl-μ-heptadecylbenzimidazole disulfonic acid and 1 part of a concentrated aqueous ammonia solution per 1000 parts of water. The material is then treated for 15 minutes at 50° C. in a bath containing 9 parts of diammonium phosphate and 1.5 parts of the sodium salt of N-benzyl-μ-heptadecylbenzimidazole disulfonic acid in 3000 parts of water.

9 parts of sodium-ortho-phenylphenolate (dissolved) are then slowly added and uptake of the liberated ortho-phenyl-phenol is brought about by agitating the textile material for 15 minutes at 50 to 55° C. 10 parts of the dyestuff paste obtained in the manner described in the first paragraph of this example are then added. The dyebath is then brought to the boil in the course of ½ to ¾ hour and dyeing is continued for 1 to 1½ hours at a temperature as close to the boil as possible. The material is then well rinsed and, if necessary, washed for ½ hour at 60 to 80° C. in a solution containing 1 part of the sodium salt of N-benzyl-μ-heptadecylbenzimidazole disulfonic acid per 1000 parts of water. A red dyeing possessing an excellent fastness to sublimation and to light is obtained. Virtually no dyestuff is taken up by wool treated in the same bath.

What is claimed is:

1. Dyestuffs of the formula

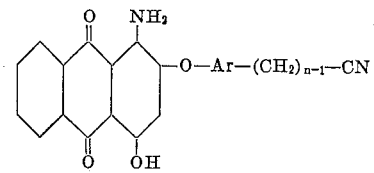

in which Ar represents a phenylene radical, and $n$ represents an integer of 1 to 5.

2. Dyestuffs as claimed in claim 1 of the formula

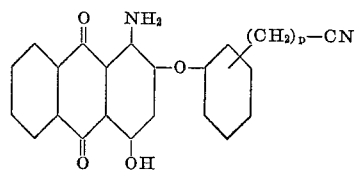

in which $p$ represents an integer of 1 to 3.

3. The dyestuff as claimed in claim 1 of the formula

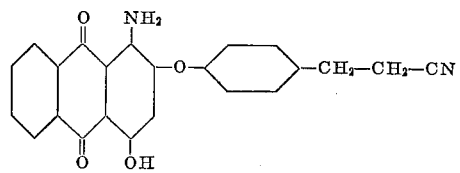

References Cited

UNITED STATES PATENTS

| | | | |
|---|---|---|---|
| 2,820,051 | 1/1958 | Buc | 260—380 X |
| 2,850,510 | 9/1958 | Hoefle et al. | 260—373 |
| 3,226,177 | 12/1965 | Hosoda et al. | 260—380 X |
| 3,264,325 | 8/1966 | Lewis | 260—380 |

OTHER REFERENCES

Luos, H. A.: Synthetic Dyes and Pigments, 1955, pp. 670–671. New York, Hafner Publishing Co.

LORRAINE A. WEINBERGER, *Primary Examiner.*

HAROLD C. WEGNER, *Assistant Examiner.*